(12) United States Patent
Kitahara

(10) Patent No.: US 9,900,791 B2
(45) Date of Patent: Feb. 20, 2018

(54) MONITORING DEVICE, RADIO COMMUNICATION SYSTEM, FAILURE PREDICTION METHOD AND NON-TEMPORARY COMPUTER-READABLE MEDIUM IN WHICH A PROGRAM IS STORED

(71) Applicant: NEC Corporation, Tokyo (JP)

(72) Inventor: Yoshinori Kitahara, Tokyo (JP)

(73) Assignee: NEC Corporation, Tokyo (JP)

( * ) Notice: Subject to any disclaimer, the term of this patent is extended or adjusted under 35 U.S.C. 154(b) by 6 days.

(21) Appl. No.: 15/116,369

(22) PCT Filed: Jan. 8, 2015

(86) PCT No.: PCT/JP2015/000067
§ 371 (c)(1),
(2) Date: Aug. 3, 2016

(87) PCT Pub. No.: WO2015/118800
PCT Pub. Date: Aug. 13, 2015

(65) Prior Publication Data
US 2016/0353297 A1    Dec. 1, 2016

(30) Foreign Application Priority Data
Feb. 5, 2014 (JP) .................................. 2014-019929

(51) Int. Cl.
*H04W 24/04* (2009.01)
*H04B 17/10* (2015.01)
(Continued)

(52) U.S. Cl.
CPC .......... *H04W 24/04* (2013.01); *H04B 17/104* (2015.01); *H04B 17/26* (2015.01);
(Continued)

(58) Field of Classification Search
None
See application file for complete search history.

(56) References Cited

U.S. PATENT DOCUMENTS

| | | | |
|---|---|---|---|
| 9,298,553 B2* | 3/2016 | Andrade Costa | ... G06F 11/1415 |
| 2004/0136708 A1* | 7/2004 | Woolf | .................... H04B 17/15 398/22 |

(Continued)

FOREIGN PATENT DOCUMENTS

| | | |
|---|---|---|
| EP | 1865620 A1 | 12/2007 |
| JP | H05-30085 A | 2/1993 |

(Continued)

OTHER PUBLICATIONS

International Search Report corresponding to PCT/JP2015/000067 dated Mar. 24, 2015 (2 pages).

*Primary Examiner* — Hong Cho
(74) *Attorney, Agent, or Firm* — Wilmer Cutler Pickering Hale & Dorr

(57) ABSTRACT

A monitoring device which enables a user to address a failure before said failure occurs, a radio communication system, a failure prediction method and a non-temporary computer-readable medium in which a program is stored are provided. This monitoring device is provided with an acquisition unit and a prediction unit. The acquisition unit acquires history data which is generated in one or more radio communication devices and which indicates at least the time at which a received signal level falls below a preset threshold level in each preset time period. The prediction unit predicts, based on the history data, the possibility of a failure occurring in the radio communication device.

10 Claims, 9 Drawing Sheets

(51) Int. Cl.
*H04B 17/26* (2015.01)
*H04B 17/318* (2015.01)
*H04B 17/373* (2015.01)
*H04B 17/17* (2015.01)
*H04B 17/23* (2015.01)

(52) U.S. Cl.
CPC ......... *H04B 17/318* (2015.01); *H04B 17/373* (2015.01); *H04B 17/17* (2015.01); *H04B 17/23* (2015.01)

(56) References Cited

U.S. PATENT DOCUMENTS

2009/0295636 A1 12/2009 Taniguchi et al.
2015/0310349 A1* 10/2015 Li ........................ G06N 7/005
706/52

FOREIGN PATENT DOCUMENTS

| JP | 2001-086047 A | 3/2001 |
| JP | 2004-112152 A | 4/2004 |
| JP | 2006-287653 A | 10/2006 |
| JP | 2012-074765 A | 4/2012 |

* cited by examiner

Fig. 4

HISTORY DATA

| TIME | MAIN RECEIVED SIGNAL LOW-LEVEL TIME $T_{main}$ (s) | SECONDARY RECEIVED SIGNAL LOW-LEVEL TIME $T_{sd}$ (s) | COMBINED RECEIVED SIGNAL LOW-LEVEL TIME $T_{rx}$ (s) |
|---|---|---|---|
| 2014/01/01_7:00 | | | |
| 2014/01/01_7:15 | | | |
| 2014/01/01_7:30 | | | |
| 2014/01/01_7:45 | | | |
| 2014/01/01_8:00 | | | |
| 2014/01/01_8:15 | | | |
| 2014/01/01_8:30 | | | |

Fig. 8

WARNING LIST

DISPLAY PERIOD  From  2014/01/01  to  2014/01/31

| DEVICE NAME | MODEL | EARLY WARNING (LINE FAILURE) | CAUTION RECOMMENDED | EARLY WARNING (EQUIPMENT FAILURE) |
|---|---|---|---|---|
| DEVICE A | MODEL A | ○ | ○ | ○ |
| DEVICE B | MODEL B | ○ | — | — |
| DEVICE C | MODEL C | — | ○ | — |
| DEVICE D | MODEL D | — | ○ | ○ |
| DEVICE E | MODEL A | — | — | — |

Fig. 9

LIST BY DEVICE

DEVICE NAME: DEVICE A    DISPLAY PERIOD    From  2014/01/01   to   2014/01/31

| WARNING TYPE | START TIME | END TIME |
|---|---|---|
| CAUTION RECOMMENDED | 2014/01/01_08:00 | 2014/01/01_18:00 |
| EARLY WARNING (LINE FAILURE) | 2014/01/09_15:00 | 2014/01/09_18:00 |
| EARLY WARNING (EQUIPMENT FAILURE) | 2014/01/10_18:00 | 2014/01/10_21:00 |

MONITORING DEVICE, RADIO COMMUNICATION SYSTEM, FAILURE PREDICTION METHOD AND NON-TEMPORARY COMPUTER-READABLE MEDIUM IN WHICH A PROGRAM IS STORED

CROSS-REFERENCE TO RELATED APPLICATIONS

This application is a national stage application of International Application No. PCT/JP2015/000067 entitled "Monitoring Device, Radio Communication System, Failure Prediction Method and Non-Temporary Computer-Readable Medium In Which A Program Is Stored" filed on Jan. 8, 2015, which claims priority to Japanese Application No. 2014-019929 filed on Feb. 5, 2014, the disclosures of which are hereby incorporated by reference in their entirety.

TECHNICAL FIELD

The present invention relates to a monitoring device, a wireless communication system, a failure prediction method, and a non-transitory computer-readable medium where a program is stored, and more particularly, to a monitoring device, a wireless communication system, a failure prediction method, and a non-transitory computer-readable medium where a program is stored, where history data about a wireless communication device is monitored.

BACKGROUND ART

In wireless communications, a wireless communication device is subject to failures, such as a reduced received signal level (RSL), increased bit errors, and interrupted communications, caused by a natural phenomenon, equipment failure, or the like. Concerning failures on a wireless line, there may appear a sign of fading or other failure causes. Detecting such sign of a failure cause in advance and proactively dealing with the failure cause can reduce failures before they occur.

In relation to the above-described art, PTL 1, for example, discloses a wireless device that identifies the cause of failure on a wireless link with another wireless station to take a countermeasure. The wireless device according to PTL 1 obtains characteristic values of statistical information representing the state of the wireless link, and detects, in a predetermined order and based on the characteristic values, a plurality of causes of failure associated in advance with statistical information. In addition, the wireless device according to PTL 1 takes the countermeasures associated with the detected causes of failure. According to PTL 1, the plurality of causes of failure include the presence of: shadowing, radio noise, multi-path fading, heavy traffic, and a hidden terminal. The detection in a predetermined order refers to detecting the presence of shadowing, followed by detecting the presence of radio noise, and further detecting the presence of multi-path fading, heavy traffic, and a hidden terminal in a predetermined order.

As another example, PTL 2 discloses a technique to detect and notify an abnormality of equipment or a line by using a space diversity in-phase combining board (SD COMB board) that is used for a multiplex wireless device. The SD COMB board includes: first and second signal distributors that branch an input signal into two signals; a phase shifter that adjusts the phase of a signal inputted based on a control signal; first and second AGC amplifiers that control gains so as to have a constant amplitude; and a phase comparison mixer that multiplies an output signal of the first AGC amplifier by an output signal of the second AGC amplifier and outputs a phase comparison result signal that indicates the phase difference. The SD COMB board further includes: a control circuit that outputs a control signal according to the phase comparison result signal; first and second detection circuits that output first and second detection signals indicating the presence or absence of an input signal; a third detection circuit that detects an abnormality of equipment or an input signal based on the phase comparison result signal and on the first and second detection signals; and a warning means that displays an abnormality of equipment or an input signal based on the detection result produced by the third detection circuit.

CITATION LIST

Patent Literature

PTL 1: Japanese Unexamined Patent Application Publication No. 2012-74765
PTL 2: Japanese Unexamined Patent Application Publication No. 2001-86047

SUMMARY OF INVENTION

Technical Problem

The above patent literatures only disclose techniques for detecting a failure that has already occurred. That is, the above patent literatures do not achieve finding the likelihood that a failure may occur before the failure occurs. Thus, according to the above patent literatures, the user cannot deal with a failure before the failure occurs. Consequently, the above patent literatures cannot reduce failures before they occur.

The present invention has been created for the purpose of solving these problems, and an objective of the present invention is to provide a monitoring device, a wireless communication system, a failure prediction method, and a non-transitory computer-readable medium where a program is stored, all of which enable users to deal with a failure before the failure occurs.

Solution to Problem

A first monitoring device according to the present invention includes: acquisition means that acquires history data which is generated by at least one wireless communication device and which at least indicates a time for which a received signal level is below a predetermined threshold level during each predetermined period; and prediction means that predicts, based on the history data, that a failure is likely to occur with respect to the wireless communication device, wherein the wireless communication device includes: a main receiver; a secondary receiver; and a combiner that combines received signals received by the main receiver and the secondary receiver, wherein information about the received signal level includes: a first time indicating a time for which a received signal level in the main receiver is below the threshold level; a second time indicating a time for which a received signal level in the secondary receiver is below the threshold level; and a third time indicating a time for which a level of a received signal produced through combination in the combiner is below the threshold level, and wherein the prediction means predicts, based on the first time, the second time, and the third time, that a failure is likely to occur with respect to the wireless communication device.

A second monitoring device according to the present invention includes: acquisition means that acquires history regarding a wireless communication device, the device including: a first receiver; a second receiver, and a combiner that combines received signals received by the first receiver and the second receiver, the history being about a received signal level in the first receiver, a received signal level in the second receiver, and a received signal level in the combiner; and prediction means that predicts, based on the history, that a failure is likely to occur with respect to the wireless communication device.

A failure prediction method according to the present invention includes: acquiring history data that is generated by at least one wireless communication device, the history data indicating, with respect to each predetermined period, at least: a first time indicating a time for which a received signal level in a main receiver for the wireless communication device is below a predetermined threshold level; a second time indicating a time for which a received signal level in a secondary receiver for the wireless communication device is below the threshold level; and a third time indicating a time for which a level of a received signal produced through combination in a combiner that combines received signals received by the main receiver and the secondary receiver is below the threshold level; and predicting, based on the first time, the second time, and the third time in the history data, that a failure is likely to occur with respect to the wireless communication device.

A wireless communication system according to the present invention includes: at least one wireless communication device; acquisition means that acquires history data which is generated by the wireless communication device and which at least indicates a time for which a received signal level is below a predetermined threshold level during each predetermined period; and prediction means that predicts, based on the history data, that a failure is likely to occur with respect to the wireless communication device, wherein the wireless communication device includes: a main receiver; a secondary receiver; and a combiner that combines received signals received by the main receiver and the secondary receiver, wherein information about the received signal level includes: a first time indicating a time for which a received signal level in the main receiver is below the threshold level; a second time indicating a time for which a received signal level in the secondary receiver is below the threshold level; and a third time indicating a time for which a level of a received signal produced through combination in the combiner is below the threshold level, and wherein the prediction means predicts, based on the first time, the second time, and the third time, that a failure is likely to occur with respect to the wireless communication device.

A program according to the present invention causes a computer to execute the steps of: acquiring history data that is generated by at least one wireless communication device, the history data indicating, with respect to each predetermined period, at least: a first time indicating a time for which a received signal level in a main receiver for the wireless communication device is below a predetermined threshold level; a second time indicating a time for which a received signal level in a secondary receiver for the wireless communication device is below the threshold level; and a third time indicating a time for which a level of a received signal produced through combination in a combiner that combines received signals received by the main receiver and the secondary receiver is below the threshold level; and predicting, based on the first time, the second time, and the third time in the history data, that a failure is likely to occur with respect to the wireless communication device.

Advantageous Effects of Invention

According to the present invention, there can be provided a monitoring device, a wireless communication system, a failure prediction method, and a non-transitory computer-readable medium where a program is stored, all of which enable users to deal with a failure before the failure occurs.

BRIEF DESCRIPTION OF DRAWINGS

FIG. 4 illustrates an example of history data generated by the wireless communication device according to the first exemplary embodiment.

FIG. 8 illustrates an example warning list displayed by a prediction result display unit according to the first exemplary embodiment.

FIG. 9 illustrates an example list by device displayed by the prediction result display unit according to the first exemplary embodiment.

DESCRIPTION OF EMBODIMENTS

Overview of Exemplary Embodiment

Figure 1:
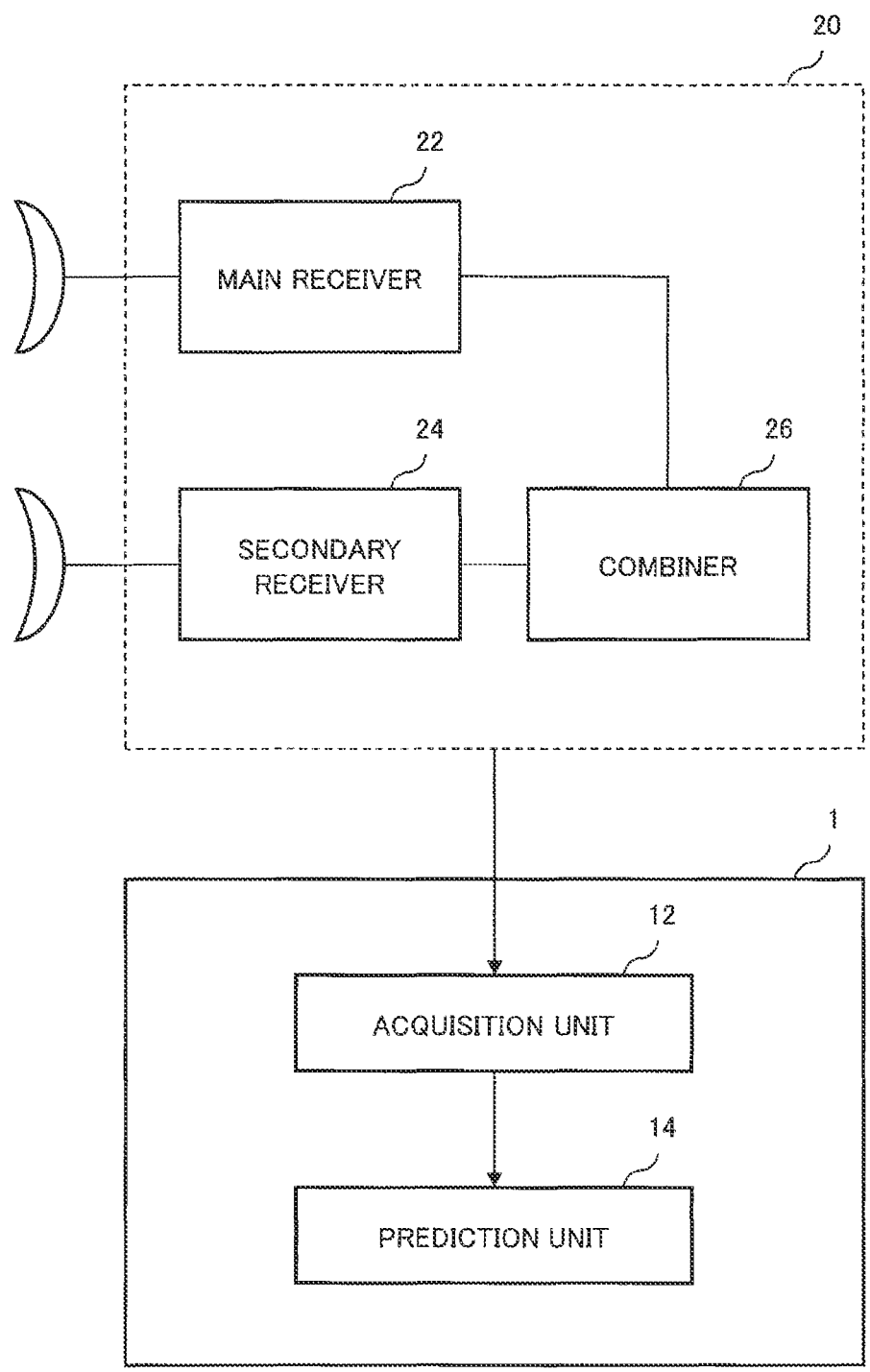
FIG. 1 is a diagram schematically illustrating a monitoring device according to an exemplary embodiment.

Before describing exemplary embodiments, the following provides an overview of the present exemplary embodiment referring to FIG. 1. FIG. 1 is a diagram schematically illustrating a monitoring device 1 according to the present exemplary embodiment. As depicted in FIG. 1, the monitoring device 1 includes an acquisition unit 12 (acquisition means) and a prediction unit 14 (prediction means). The acquisition unit 12 obtains the history data that is generated by at least one wireless communication device 20 and shows at least a time for which a received signal level is below a predetermined threshold level in each predetermined period. The prediction unit 14 predicts, based on the history data, that a failure is likely to occur with respect to the wireless communication device 20.

The wireless communication device 20 includes a main receiver 22, a secondary receiver 24, and a combiner 26 that combines received signals received by the main receiver 22 and the secondary receiver 24. Information about a received signal level includes a first time, a second time, and a third time. The first time indicates a time for which a received signal level in the main receiver 22 is below a threshold level. The second time indicates a time for which a received signal level in the secondary receiver 24 is below a threshold level. The third time indicates a time for which a level of a received signal produced through combination in the combiner 26 is below a threshold level. The prediction unit 14 predicts, based on the first, second, and third times, that a failure is likely to occur with respect to the wireless communication device 20.

The monitoring device 1 according to the present exemplary embodiment predicts that a failure is likely to occur with respect to the wireless communication device 20, and thus the user can deal with the failure before it occurs. Hence, it becomes possible to reduce failures before they actually occur. The acquisition unit 12 and the prediction unit 14 each may be disposed on separate devices that are physically apart from each other. A failure prediction method that includes processes performed by the individual components of the above-described monitoring device 1 also makes it possible to predict that a failure is likely to occur with respect to the wireless communication device 20.

First Exemplary Embodiment

Exemplary embodiments of the present invention will now be described with reference to the drawings.

Figure 2:
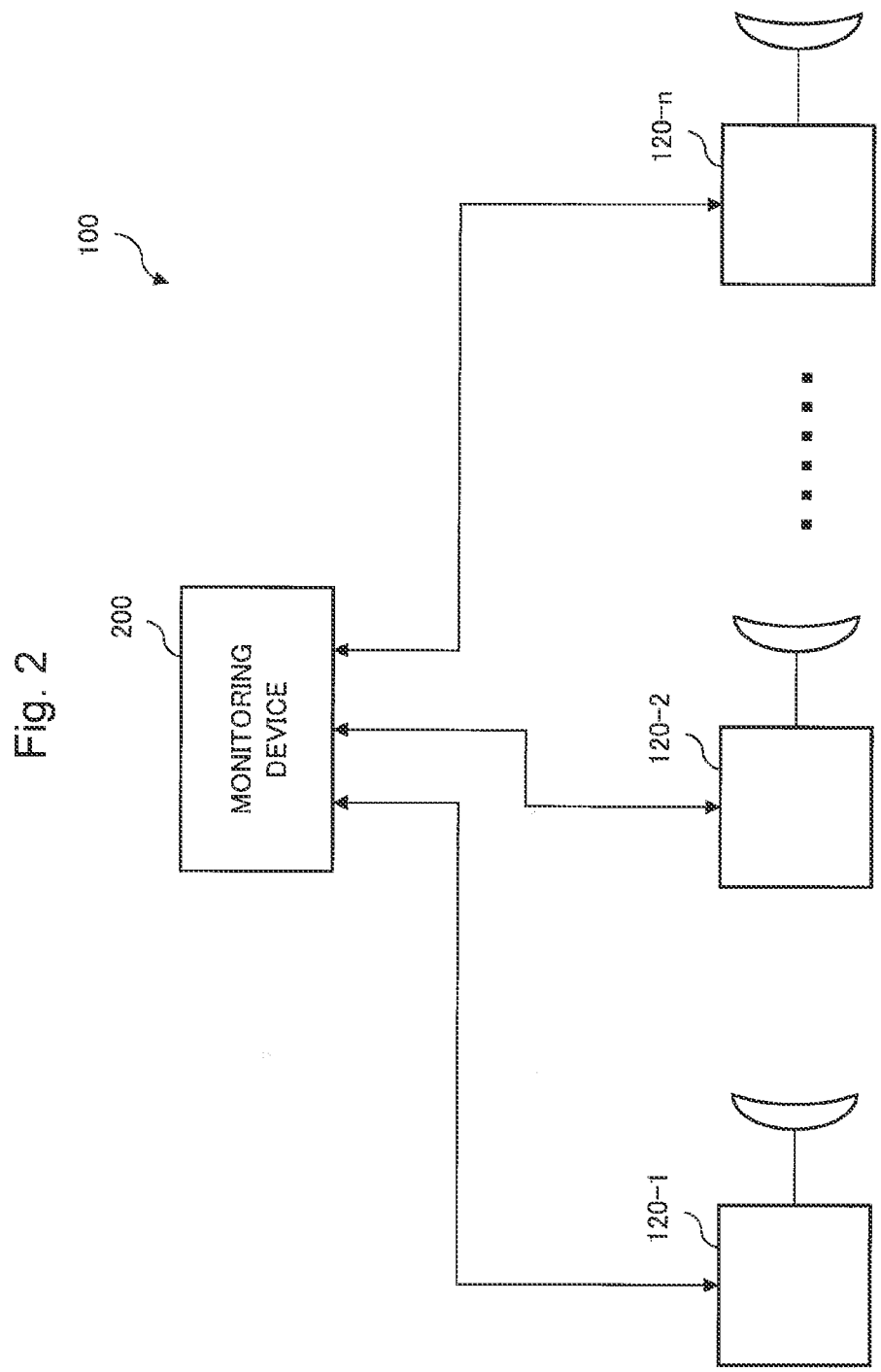
FIG. 2 is a diagram illustrating a wireless communication system according to a first exemplary embodiment.

FIG. 2 is a diagram illustrating a wireless communication system 100 according to a first exemplary embodiment. The wireless communication system 100 is composed of wireless communication devices 120-1 to 120-n (where n is an integer equal to or greater than 1) and a monitoring device 200 (corresponding to the monitoring device 1). The wireless communication devices 120-1 to 120-n are hereinafter collectively called wireless communication device 120 unless individually identified in the descriptions.

A wireless communication device 120 (e.g., the wireless communication device 120-1) carries out wireless communications with another wireless communication device 120 (e.g., the wireless communication device 120-2) via a wireless line. The monitoring device 200 has the functions of the monitoring device 1 illustrated in FIG. 1. The monitoring device 200 monitors performance of the wireless communication devices 120-1 to 120-n and quality and operational status (performance) of wireless lines.

The wireless communication device 120 employs the space diversity (SD) method to deal with natural phenomena such as fading. Specifically, the wireless communication device 120 is configured to include a plurality of antennas as illustrated in FIG. 3 so as to combine received signals received by the plurality of antennas.

Figure 3:
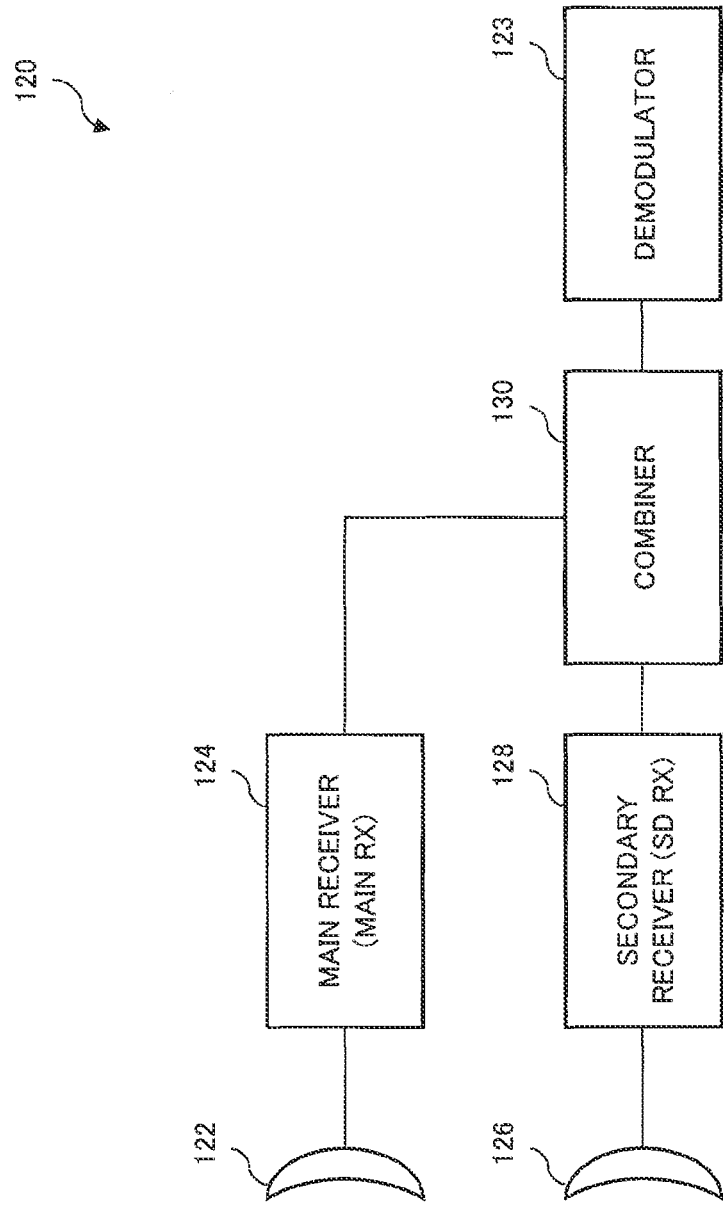
FIG. 3 is a diagram illustrating a configuration of the receiving side of a wireless communication device according to the first exemplary embodiment.

FIG. 3 is a diagram illustrating a configuration of the receiving side of the wireless communication device 120. The wireless communication device 120 includes a main antenna 122, a main receiver 124 (Main_RX), a secondary antenna 126, a secondary receiver 128 (SD_RX), a combiner 130, and a demodulator 123. The main antenna 122 is located at a higher position than the secondary antenna 126 in the wireless communication device 120.

The main receiver 124 receives via the main antenna 122 radio waves transmitted from a transmitting wireless communication device 120. In addition, the main receiver 124 measures the level (main received signal level) of a received signal (main received signal) in the main receiver 124. That is, the main received signal level is the RSL in the main receiver 124.

The secondary receiver 128 receives via the secondary antenna 126 radio waves transmitted from a transmitting wireless communication device 120. In addition, the secondary receiver 128 measures the level (secondary received signal level) of a received signal (secondary received signal) in the secondary receiver 128. That is, the secondary received signal level is the RSL in the secondary receiver 128.

The combiner 130 combines a main received signal in the main receiver 124 with a secondary received signal in the secondary receiver 128. In addition, the combiner 130 measures the level (combined received signal level) of a received signal produced through the combination (combined received signal). That is, the combined received signal level is the RSL in the combiner 130.

The demodulator 123 performs a process of demodulating radio waves using the combined received signal produced in the combiner 130.

As described above, the main antenna 122 is disposed at a position higher than the secondary antenna 126. That is, the distance between the main antenna 122 and the combiner 130 is different from the distance between the secondary antenna 126 and the combiner 130. Thus, if signals are combined without any actions, radio waves from the main antenna 122 and from the secondary antenna 126 may be canceled out by each other, depending on the phase. For this reason, the combiner 130 has a function to adjust the phase of a radio wave from the secondary antenna 126 (or a radio wave from the main antenna 122), depending on the distances between the main antenna 122 and the combiner 130 and between the secondary antenna 126 and the combiner 130. The phase adjustment function may be the Differential Absolute Delay Equalization (DADE) function.

The wireless communication device 120 generates the history data as illustrated in FIG. 4 at predetermined regular intervals. The history data constitutes performance monitoring data (PM data) representing performance, operational status, and other information about the individual wireless communication devices 120. The wireless communication device 120 takes measurements of data (performance parameters) that indicates performance, quality and operational status of a wireless line, and the like at predetermined regular intervals. In addition, the wireless communication device 120 generates a period file that includes measured values taken during the relevant period.

FIG. 4 illustrates an example of history data generated by a wireless communication device 120. According to the example in FIG. 4, period files (15-minute files) are generated at intervals of 15 minutes as specified by the International Telecommunication Union Telecommunication Standardization Sector (ITU-T). A period file at least includes a main received signal low-level time Tmain (a first time), a secondary received signal low-level time Tsd (a second time), and a combined received signal low-level time Trx (a third time). In other words, a wireless communication device 120 measures at least a main received signal low-level time Tmain, a secondary received signal low-level time Tsd, and a combined received signal low-level time Trx at intervals of 15 minutes.

The main received signal low-level time Tmain (s) refers to a time for which a main received signal level is below a predetermined threshold level RSLth during a 15-minute period. The secondary received signal low-level time Tsd (s) refers to a time for which a secondary received signal level is below the threshold level RSLth during a 15-minute period. The combined received signal low-level time Trx (s) refers to a time for which a combined received signal level is below the threshold level RSLth during a 15-minute period. The threshold level RSLth may be set to any value by the user.

In addition, a wireless communication device 120 generates a period file that includes these measured values at intervals of 15 minutes. The example in FIG. 4 shows a period file generated at 7:00 on Jan. 1, 2014, a period file generated at 7:15 on Jan. 1, 2014, a period file generated at 7:30 on Jan. 1, 2014, and so on. For example, the period file generated at 7:00 on Jan. 1, 2014 includes a main received signal low-level time, a secondary received signal low-level time, and a combined received signal low-level time that were measured during a 15-minute period from 6:45 to 7:00 on Jan. 1, 2014.

Figure 5:
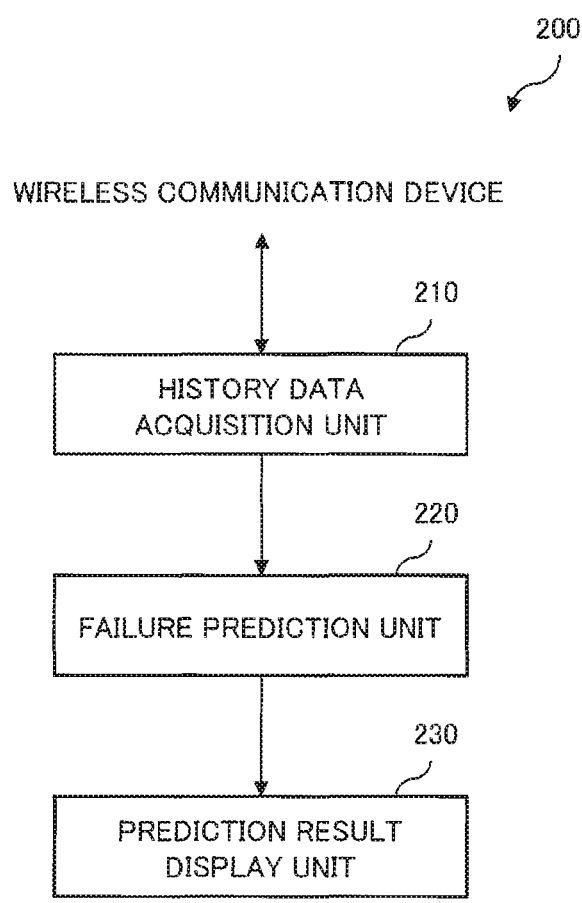
FIG. 5 is a functional block diagram illustrating a configuration of the monitoring device according to the first exemplary embodiment.

FIG. 5 is a functional block diagram illustrating a configuration of the monitoring device 200 according to the first exemplary embodiment. The monitoring device 200 includes a history data acquisition unit 210, a failure prediction unit 220, and a prediction result display unit 230 (display means). With these components, the monitoring device 200 predicts that a failure is likely to occur with respect to the relevant wireless communication device 120 before the failure occurs. In addition, the monitoring device 200 causes a prediction result to be displayed on a display screen such as a monitor. The monitoring device 200 may include functions of a computer in addition to the components illustrated in FIG. 5. In other words, the monitoring device 200 may include a computing device such as a CPU, a storage device such as memory, a communication device communicating to other devices including a wireless communication device 120, an input device such as a keyboard and a mouse, and an output device such as a monitor.

The history data acquisition unit 210 corresponds to the acquisition unit 12 illustrated in FIG. 1. The history data acquisition unit 210 acquires history data as illustrated in FIG. 4 from each of the wireless communication devices 120-1 to 120-$n$ and outputs it to the failure prediction unit 220. Specifically, the history data acquisition unit 210 accesses each of the wireless communication devices 120-1 to 120-$n$ at a predetermined time of day (e.g., at 24:00) to acquire the history data generated by each of the wireless communication devices 120-1 to 120-$n$. For this purpose, the history data acquisition unit 210 may control a communication device disposed on the monitoring device 200 to acquire the history data.

The failure prediction unit 220 corresponds to the prediction unit 14 illustrated in FIG. 1. For each of the wireless communication devices 120, the failure prediction unit 220 predicts that a failure is likely to occur with respect to the wireless communication device 120 by using the history data that relates to the relevant wireless communication device 120 and is acquired by the history data acquisition unit 210. Additionally, the failure prediction unit 220 outputs the data representing a prediction result to the prediction result display unit 230. Detail descriptions will be provided later.

The following describes the mechanism by which the failure prediction unit 220 predicts that a failure is likely to occur on a wireless line for a wireless communication device 120. One cause of failures occurring on a wireless line may be fading, which is caused by natural phenomena. Fading causes a decrease in RSL, among others. The fading occurs due to an insufficient clearance between a radio wave and the ground or earth, caused by fluctuations in the K-factor (effective Earth-radius factor) or the like. As an insufficient clearance gradually increases, at first, a received signal level is reduced in the secondary receiver 128, which receives radio waves via the secondary antenna 126 being located at a lower position closer to the ground or earth. As an insufficient clearance further increases, a received signal level is also reduced in the main receiver 124, which receives radio waves via the main antenna 122 being located at a higher position. When the main received signal level is reduced in addition to the secondary received signal level, it is deemed that a failure has occurred on a wireless line due to fading. That is, an "insufficient clearance" is a phenomenon that may cause a failure on a wireless line.

Thus, the failure prediction unit 220 uses the history data to detect a tendency of the secondary received signal level to lower and then of the main received signal level (and the combined received signal level) to lower, caused by an increase in an insufficient clearance. If the tendency is detected, the failure prediction unit 220 predicts that fading is likely to occur due to an insufficient clearance, and accordingly a line failure is likely to occur.

Figure 6:
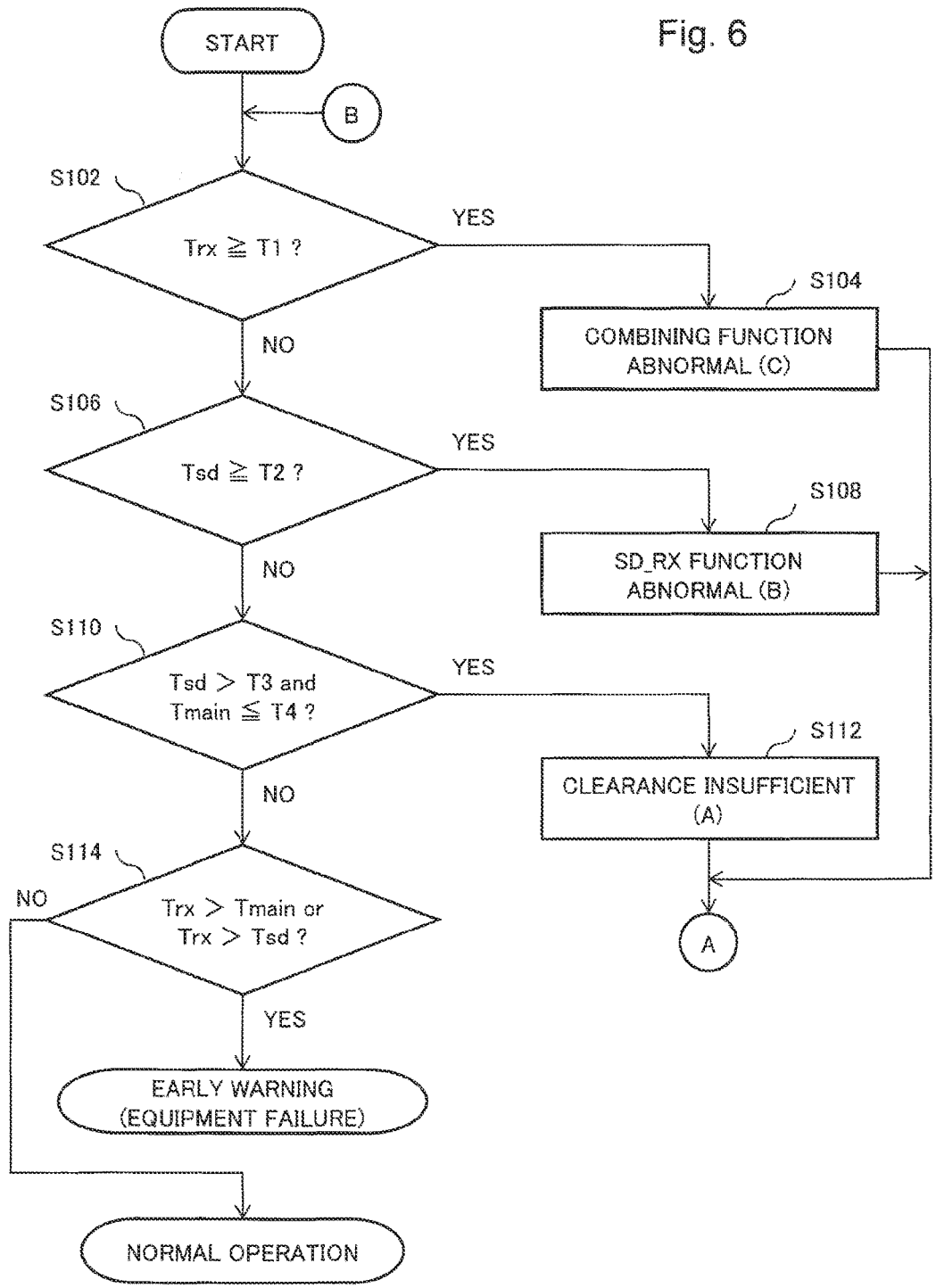
FIG. 6 is a flow chart illustrating processes performed by a failure prediction unit according to the first exemplary embodiment.
Figure 7:
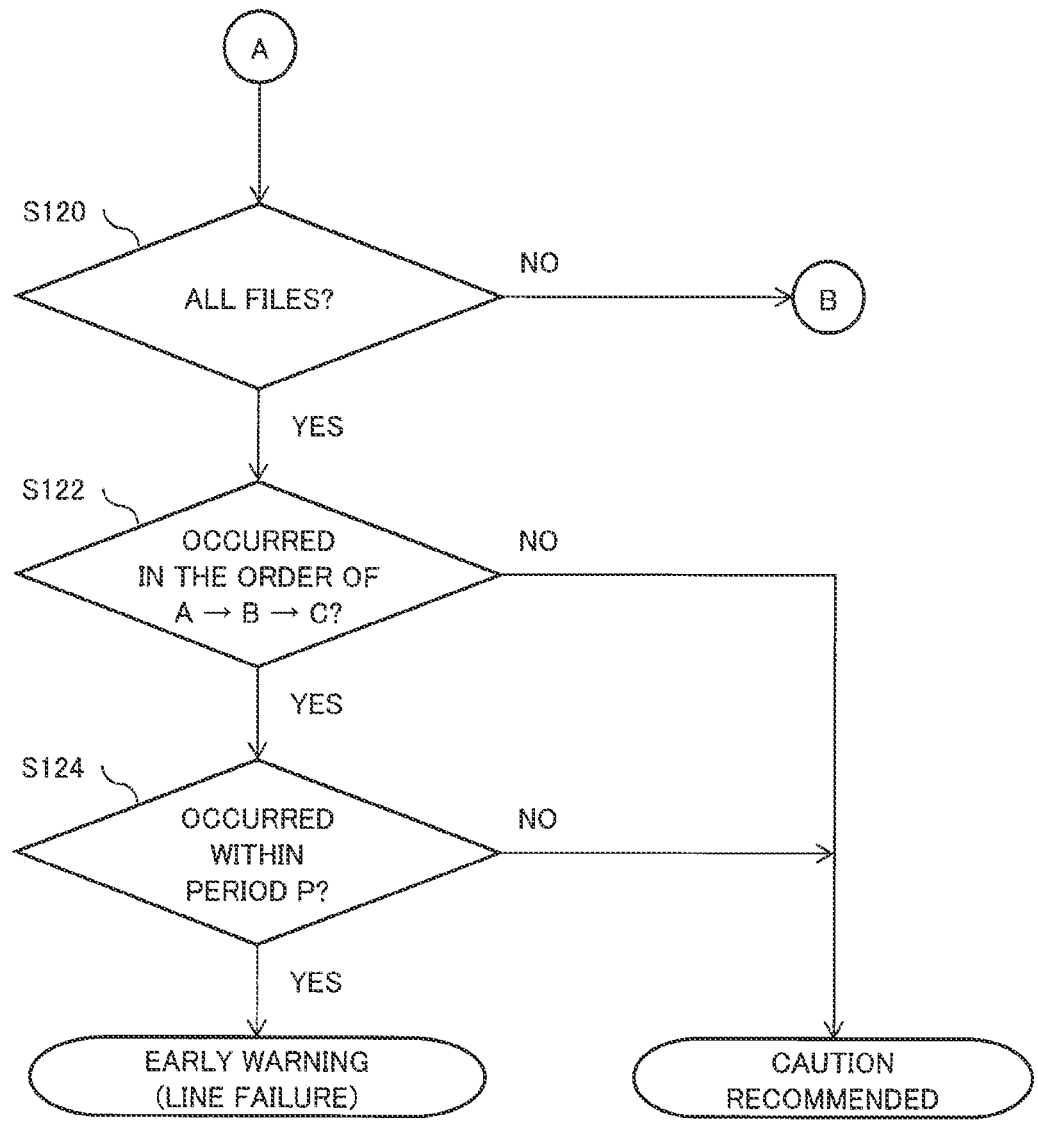
FIG. 7 is a flow chart illustrating processes performed by the failure prediction unit according to the first exemplary embodiment.

FIGS. 6 and 7 are flow charts illustrating processes performed by the failure prediction unit 220. The failure prediction unit 220 performs the processes illustrated in the flow charts in FIGS. 6 and 7 on each of the wireless communication devices 120-1 to 120-$n$.

The failure prediction unit 220 determines whether the combined received signal low-level time Trx is equal to or greater than a predetermined threshold time T1 (a third threshold time) with respect to a period file (S102). The threshold time T1 (s) is a limit of time representing that in the case where the combined received signal level is below a threshold level RSLth for a period equal to or longer than the threshold time, it is a sign that the combiner 130 has an abnormality. For example, T1 may be 900 (=60 seconds×15 minutes), which is a maximum allowable value for T1. In this case, the combiner 130 will be determined to have an abnormality if the combined received signal level is below a threshold level RSLth during the whole 15-minute period. The threshold time T1 may be set to any value by the user. If the combined received signal low-level time Trx is equal to or greater than a threshold time T1 (e.g., 900 seconds) (YES in S102), the failure prediction unit 220 determines that the combiner 130 has an abnormality of its combining function ("Combining Function Abnormal") (S104).

On the other hand, if the combined received signal low-level time Trx is less than the threshold time T1 (NO in S102), the failure prediction unit 220 determines whether the secondary received signal low-level time Tsd is equal or greater than a predetermined threshold time T2 (a second threshold time) (S106). The threshold time T2 (s) is a limit of time representing that in the case where the secondary received signal level is below a threshold level RSLth for a period equal to or longer than the threshold time, it is a sign that the secondary receiver 128 has an abnormality. For example, T2 may be 900, which is a maximum allowable value for T2. In this case, the secondary receiver 128 will be determined to have an abnormality if the secondary received signal level is below the threshold level RSLth during the whole 15-minute period. The threshold time T2 may be set to any value by the user. If the secondary received signal low-level time Tsd is equal to or greater than a threshold time T2 (e.g., 900 seconds) (YES in S106), the failure prediction unit 220 determines that the secondary receiver 128 has an abnormality of its function ("SD_RX Function Abnormal") (S108).

On the other hand, if the secondary received signal low-level time Tsd is less than the threshold time T2 (NO in S106), the failure prediction unit 220 determines whether the secondary received signal low-level time Tsd is greater than a predetermined threshold time T3 and whether the main received signal low-level time Tmain is equal to or less than a predetermined threshold time T4 (a first threshold time) (S110). In other words, the failure prediction unit 220 determines whether Tsd is within a predetermined range "T3<Tsd<T2" and whether Tmain≤T4 is satisfied.

T3 and T2 are expressed as T3<T2. The threshold time T3 is a limit of time representing that in the case where the secondary received signal low-level time Tsd exceeds the threshold time, it is a sign that the received signal level in the secondary receiver 128 was reduced due to external factors such as the above-described insufficient clearance, although the secondary receiver 128 may not have abnormalities. The threshold time T4 is a limit of time representing that in the case where the main received signal low-level time Tmain is equal to or less than the threshold time, it is a sign that the main receiver 124 does not have any abnormal main received signal levels. For example, T4=0. That is, if the main received signal level is equal to or greater than the threshold level RSLth during the whole 15-minute period, the main received signal level is determined not to be abnormal. The threshold times T3 and T4 may be set to any values by the user.

As described above, an insufficient clearance creates a tendency of a received signal level in the secondary receiver 128 to be reduced before a received signal level in the main receiver 124 is reduced. Accordingly, if T3<Tsd<T2 and Tmain T4 are satisfied (YES in S110), the failure prediction unit 220 determines that an event of "Clearance Insufficient" occurred (S112). An event of "Clearance Insufficient" as used herein includes maladjustment of the direction of the secondary antenna 126.

On the other hand, if T3<Tsd<T2 is not satisfied or if Tmain T4 is not satisfied (NO in S110), the failure prediction unit 220 determines whether the combined received signal low-level time Trx is greater than the main received signal low-level time Tmain or whether the combined received signal low-level time Trx is greater than the secondary received signal low-level time Tsd (S114). A combined received signal is produced by combining a main received signal with a secondary received signal. Thus, a combined received signal level is normally higher than a main received signal level. In other words, a combined received signal low-level time Trx is normally smaller than a main received signal low-level time Tmain. Likewise, a combined received signal level is normally higher than a secondary received signal level. In other words, a combined received signal low-level time Trx is normally smaller than a secondary received signal low-level time Tsd.

Thus, if Trx>Tmain or Trx>Tsd is satisfied (YES in S114), an equipment failure may have occurred in the wireless communication device 120. Accordingly, the failure prediction unit 220 predicts in this step that an "Equipment Failure" has occurred in the wireless communication device 120. The failure prediction unit 220 then instructs the prediction result display unit 230 to cause an early warning to be displayed. The early warning warns users that an equipment failure may have occurred. On the other hand, if Trx>Tmain is not satisfied and Trx>Tsd is not satisfied (NO in S114), the failure prediction unit 220 predicts that the wireless communication device 120 is normally operating.

The failure prediction unit 220 may additionally predict a specific failure of equipment by analyzing the history data. For example, consider the case where Trx is not equal to 0 in spite of Tmain=0 and Tsd=0. Then, if neither of the main received signal level and the secondary received signal level has fallen below RSLth, the combined received signal level should not fall below RSLth under normal conditions. Hence, it can be concluded that Trx is not equal to 0 in spite of Tmain=0 and Tsd=0 possibly because a failure occurred in equipment such as the combiner 130.

As another example, if both 0=Tmain<Tsd and Trx>Tsd are satisfied, it is determined that the main received signal level has not fallen below RSLth as long as Tmain=0 is satisfied. Accordingly, the level of the combined received signal produced by the combiner 130 should not be lower than RSLth under normal conditions. Thus, it is determined that radio waves from the main antenna 122 and from the secondary antenna 126 are possibly canceling out each other in the combiner 130. In other words, maladjustment may have occurred in the phase adjustment function of the combiner 130.

Thus, "Equipment Failure" may include failures on the combiner 130 and other individual devices disposed in the wireless communication device 120, and also may include maladjustment in the phase adjustment function of the combiner 130. Additionally, "Equipment Failure" may include maladjustment of a height pattern.

Next, the failure prediction unit 220 determines whether the processes S102 to S114 have been completed on all the period files (e.g., period files covering 24 hours) that are included in the history data acquired by the history data acquisition unit 210 (S120). If the processes are not completed on all the period files (NO in S120), the failure prediction unit 220 performs the processes S102 to S114 on the uncompleted period files.

On the other hand, if the processes have been completed on all the period files (NO in S120), the failure prediction unit 220 determines, with respect to the case where "Clearance Insufficient", "SD_RX Function Abnormal", and "Combining Function Abnormal" have all occurred, whether "Clearance Insufficient", "SD_RX Function Abnormal", and "Combining Function Abnormal" occurred in the order mentioned (S122). For example, with reference to the example in FIG. 4, if it is determined that "Clearance Insufficient" occurred in the period files "2014/01/01_7:15" to "2014/01/01_7:30", "SD_RX Function Abnormal" occurred in the period file "2014_01/01_7:45", and "Combining Function Abnormal" occurred in the period file "2014/01/01_8:00", the failure prediction unit 220 determines that "Clearance Insufficient", "SD_RX Function Abnormal", and "Combining Function Abnormal" occurred in the order mentioned.

If "Clearance Insufficient", "SD_RX Function Abnormal", and "Combining Function Abnormal" occurred in the order mentioned (YES in S122), the failure prediction unit 220 determines whether the progress of "Clearance Insufficient", "SD_RX Function Abnormal", and "Combining Function Abnormal" was made within a period P (hour) (S124). The period P may be set to any value depending on the tendency of fading to occur. For example, P may be 6 (hours). If these events occurred in the order mentioned within the period P, it is highly likely that an insufficient clearance will cause fading, which in turn will cause a line failure.

Accordingly, if the progress of "Clearance Insufficient", "SD_RX Function Abnormal", and "Combining Function Abnormal" was made within a period P (YES in S124), the failure prediction unit 220 predicts that a line failure due to an insufficient clearance is likely to occur. In other words, the failure prediction unit 220 predicts that the target wireless communication device 120 is prone to fading on its wireless line due to an insufficient clearance. In addition, the failure prediction unit 220 instructs the prediction result display unit 230 to display an early warning (a first warning)

that it is highly likely that a line failure due to an insufficient clearance will occur in the future.

On the other hand, if it is not predicted that "Clearance Insufficient", "SD_RX Function Abnormal", and "Combining Function Abnormal" occurred in the order mentioned (NO in S122) or if the progress of "Clearance Insufficient", "SD_RX Function Abnormal", and "Combining Function Abnormal" was not made within a period P (NO in S124), a line failure due to an insufficient clearance may still possibly occur in the future, although the failure is less likely to occur than in the YES branch in S124. Thus, the failure prediction unit 220 then predicts that a line failure due to an insufficient clearance may possibly occur in the future. In addition, the failure prediction unit 220 instructs the prediction result display unit 230 to display a caution recommended (a second warning) that a line failure due to an insufficient clearance may possibly occur in the future. That is, "Caution Recommended" is a less strong warning than "Early Warning".

The prediction result display unit 230 causes a display device disposed on the monitoring device 200 or another device to display the prediction result obtained by the failure prediction unit 220. Specifically, the prediction result display unit 230 causes the display device to display, for example, the warning screen illustrated in FIG. 8 or 9. The display device may be, for example, a monitor. The display device may also be constituted by a graphical user interface (GUI). In other words, the display device may be integrated with an input device such as a mouse, or may be a touch panel, a touch screen, or the like. Note that the screens illustrated in FIGS. 8 and 9 are independent from each other, and are not necessarily be associated with each other.

FIG. 8 illustrates an example warning list displayed by the prediction result display unit 230. The warning list shows by device what kind of warnings were generated during a display period specified by the user. In the example in FIG. 8, the display period is from Jan. 1, 2014 to Jan. 31, 2014. Each of the devices A to E corresponds to one of the wireless communication devices 120-1 to 120-n.

The example in FIG. 8 shows that, for example, the warnings of "Early Warning (Line Failure)", "Caution Recommended", and "Early Warning (Equipment Failure)" were generated for the device A during the aforementioned period. The example also shows that the warning of "Early Warning (Line Failure)" was generated for the device B. Likewise, the example shows that none of the warnings "Early Warning (Line Failure)", "Caution Recommended", and "Early Warning (Equipment Failure)" was generated for the device E during the aforementioned period. In this way, a warning list displayed by the prediction result display unit 230 enables the user to promptly find what kind of warnings were generated on the individual wireless communication devices 120. If no warning was generated as indicated for the device E in FIG. 8, the prediction result display unit 230 may give an indication of "Normal Operation".

FIG. 9 illustrates an example list by device displayed by the prediction result display unit 230. The list by device shows generated warnings in time series with respect to a particular device selected by the user. The list by device may be created so as to be displayed on the screen by, for example, touching or clicking the position of "Device A" as illustrated in FIG. 8.

The example in FIG. 9 shows that, for example, the event of generating "Caution Recommended" (i.e., the event of branching to NO in S122 or S124 in FIG. 7) occurred in a period from 8:00 to 18:00 on Jan. 1, 2014. Likewise, the example shows that the event of generating "Early Warning (Line Failure)" (i.e., the event of branching to YES in S124 in FIG. 7) occurred in a period from 15:00 to 18:00 on Jan. 9, 2014. Likewise, the example shows that the event of generating "Early Warning (Equipment Failure)" (i.e., the event of branching to YES in S114 in FIG. 6) occurred in a period from 18:00 to 21:00 on Jan. 10, 2014. In this way, a list by device displayed by the prediction result display unit 230 enables the user to promptly find what kind of warnings were generated and when and in which period they were generated on the selected wireless communication device 120.

According to the present exemplary embodiment, the prediction result display unit 230 causes warnings, based on the events that have occurred, to be displayed for each of the wireless communication devices 120. Thus, the user is enabled to take actions for the respective warnings before a failure occurs. Consequently, it becomes possible to reduce failures before they actually occur with respect to a wireless communication device 120.

For example, the example in FIG. 8 shows "Early Warning (Line Failure)" for the device B, and thus the user can recognize that the wireless line corresponding to the device B is prone to fading due to an insufficient clearance. Thus, the user is enabled to take a suitable action on the wireless line for the device B before fading occurs to cause a line failure. The example also shows "Caution Recommended" for the device C, and thus the user can recognize that the wireless line corresponding to the device C is prone to fading due to an insufficient clearance, although the probability is not higher than the wireless line for the device B. Thus, the user is enabled to be prepared to take a suitable action on the wireless line for the device C.

Variation Examples

The present invention is not limited to the above exemplary embodiment and may be modified as appropriate without departing from the gist of the present invention. For example, the order of processes (steps) in the flow charts described above may be changed if necessary. In addition, one or more of the plurality of processes (steps) may be omitted.

For example, the process in S124 in FIG. 7 may be omitted. That is, the failure prediction unit 220 may predict that a line failure due to an insufficient clearance is likely to occur irrespective of whether the progress of "Clearance Insufficient", "SD_RX Function Abnormal", and "Combining Function Abnormal" was made within a period P or not. However, carrying out the process in S124 makes it possible to predict more accurately that a line failure due to an insufficient clearance is likely to occur.

According to the above-described exemplary embodiment, the failure prediction unit 220 performs the process in S122 in FIG. 7 if "Clearance Insufficient", "SD_RX Function Abnormal", and "Combining Function Abnormal" occur, but the present invention is not limited to such configuration. The failure prediction unit 220 may perform the process in S122 if at least the event of "Clearance Insufficient" occurs. In other words, the prediction result display unit 230 may cause the warning of "Caution Recommended" to be displayed if at least the event of "Clearance Insufficient" occurs.

According to the above-described exemplary embodiment, the prediction result display unit 230 causes an early warning and other warnings to be displayed on the screen of a display device as illustrated in FIGS. 8 and 9, but the present invention is not limited to such configuration. The prediction result display unit 230 may display warnings by means of, for example, a light such as LED. In this case, the prediction result display unit 230 may indicate "Early Warning (Line Failure)", "Caution Recommended", and "Early Warning (Equipment Failure)" by using their corresponding different colors of a light. The prediction result display unit 230 may also indicate warnings by means of sounds such as an alarm sound. In this case, the prediction result display unit 230 may indicate "Early Warning (Line Failure)", "Caution Recommended", and "Early Warning (Equipment Failure)" by using their corresponding different sounds.

According to the above-described exemplary embodiment, the prediction result display unit 230 causes "Early Warning (Line Failure)", "Caution Recommended", and "Early Warning (Equipment Failure)" to be displayed as illustrated in FIGS. 8 and 9, but the present invention is not limited to such configuration. The prediction result display unit 230 need not display all of these warnings; for example, it may not be necessary to display "Early Warning (Equipment Failure)".

According to the above-described exemplary embodiment, the SD method is applied to wireless communication devices 120, but the SD method may not necessarily be applied to all the wireless communication devices 120 in the wireless communication system 100 illustrated in FIG. 2; provided, however, that the failure prediction unit 220 predicts that a failure is likely to occur on the wireless communication devices 120 to which the SD method is applied.

According to the above-described exemplary embodiment, a period file covers a period of 15 minutes (as specified by ITU-T), but the period is not limited to 15 minutes. A period file may cover a period longer or shorter than 15 minutes. If a period file covers a shorter period, a larger number of period file samples can be extracted compared with the above-described exemplary embodiment.

FIG. 9 lists specific warnings generated for only the wireless communication device 120 selected by the user, but the present invention is not limited to such configuration. Warnings may be generated so as to display, side by side, a list of warnings on the selected wireless communication device 120 and a list of warnings on its counterpart wireless communication device 120 that communicates with the selected wireless communication device 120. When a cause of failure occurs in respect to the selected wireless communication device 120, its counterpart wireless communication device 120 usually encounters a similar cause of failure. Thus, if the counterpart wireless communication device 120 exhibits a tendency for a different cause of failure, it is inferred that the counterpart device has a different failure. Consequently, displaying warnings for the selected wireless device 120 and for its counterpart wireless communication device 120 side by side enables the user to more accurately predict whether a failure is likely to occur.

The number of monitoring devices is not limited to one; there may be a plurality of monitoring devices. According to the above-described exemplary embodiment, the configuration includes a single monitoring device, but the present invention is not limited to such configuration. The monitoring device may be configured so that its functions are distributed to a plurality of devices that are connected with one another via a network such as the Internet by using technologies such as cloud computing or grid computing. For example, the system may be configured so that one device acquires history data from wireless communication devices 120-1 to 120-n, another device predicts that a failure is likely to occur, and still another device displays prediction results. In addition, still another device may set parameters, such as "T3", that the user can set to any value. A plurality of devices may each have a common function, and one or more functions may be implemented by a plurality of devices. The present invention encompasses these configurations.

The present invention is described as a hardware configuration in the above-described exemplary embodiment, but the present invention is not limited to such configuration. According to the present invention, processes handled by individual components in the monitoring device may be implemented by causing a central processing unit (CPU) to run a computer program.

In the above-described examples, a program can be stored to be supplied to a computer by means of various types of non-transitory computer-readable media. The non-transitory computer-readable media include various types of tangible storage media. Examples of the non-transitory computer-readable media include a magnetic recording medium (e.g., flexible disk, magnetic tape, and hard disk drive), a magneto-optic recording medium (e.g., magneto-optic disk), CD-ROM (read-only memory), CD-R, CD-R/W, and semiconductor memory (e.g., mask ROM, PROM (programmable ROM), EPROM (erasable PROM), flash ROM, and RAM (random-access memory). Alternatively, a program may be supplied to a computer by means of various types of transitory computer-readable media. Examples of the transitory computer-readable media include electric signals, optical signals, and electromagnetic waves. The transitory computer-readable media can supply a program to a computer via a wire communication path, such as an electric wire or optical fiber, or a wireless communication path.

The present invention has been described with reference to exemplary embodiments, but the invention is not limited to the above descriptions. Various modifications of the present invention that could be understood by those skilled in the art may be made to configurations or details of the present invention within the scope of the invention.

The present application claims priority based on Japanese Patent Application No. 2014-019929 filed on Feb. 5, 2014, the entire disclosure of which is incorporated herein.

REFERENCE SIGNS LIST

1 Monitoring device
12 Acquisition unit
14 Prediction unit
20 Wireless communication device
22 Main receiver
24 Secondary receiver
26 Combiner
100 Wireless communication system
120 Wireless communication device
124 Main receiver
128 Secondary receiver
130 Combiner
200 Monitoring device
210 History data acquisition unit
220 Failure prediction unit
230 Prediction result display unit

The invention claimed is:
1. A monitoring device comprising:
acquisition unit that acquires history data which is generated by at least one wireless communication device and which at least indicates a time for which a received signal level is below a predetermined threshold level during each predetermined period; and prediction unit that predicts, based on the history data, that a failure is likely to occur with respect to the wireless communication device, wherein the wireless communication device comprises: a main receiver; a secondary receiver; and a combiner that combines received signals received by the main receiver and the secondary receiver, wherein information about the received signal level comprises: a first time indicating a time for which a received signal level in the main receiver is below the threshold level; a second time indicating a time for which a received signal level in the secondary receiver is below the threshold level; and a third time indicating a time for which a level of a received signal produced through combination in the combiner is below the threshold level, and wherein the prediction unit predicts, based on the first time, the second time, and the third time, that a failure is likely to occur with respect to the wireless communication device.

2. The monitoring device according to claim 1,
wherein the prediction unit determines that, with respect to the wireless communication device, an event being likely to cause a failure on a wireless line occurred, if the second time falls within a predetermined range and the first time is equal to or less than a predetermined first threshold time.

3. The monitoring device according to claim 2, further comprising:
display unit that causes a result of the prediction to be displayed,
wherein the prediction unit determines that an abnormality in the secondary receiver occurred if the second time is equal to or greater than a predetermined second threshold time, and determines that an abnormality in the combiner occurred if the third time is equal to or greater than a predetermined third threshold time,
and wherein, if the prediction unit determines that: an event being likely to cause a failure on the wireless line occurred; then an abnormality in the secondary receiver occurred; and then an abnormality in the combiner occurred, the display unit causes a first warning to be displayed, the first warning indicating that a failure on a wireless line is likely to occur with respect to the wireless communication device.

4. The monitoring device according to claim 3,
wherein the display unit causes a second warning, which is a less strong warning than the first warning, to be displayed, if the prediction unit determines that an event being likely to cause a failure on at least the wireless line occurred, but does not determine that: an event being likely to cause a failure on the wireless line occurred; then an abnormality in the secondary receiver occurred; and then an abnormality in the combiner occurred.

5. A monitoring device comprising:
acquisition unit that acquires history regarding a wireless communication device, the device comprising: a first receiver; a second receiver, and a combiner that combines received signals received by the first receiver and the second receiver, the history being about a received signal level in the first receiver, a received signal level in the second receiver, and a received signal level in the combiner; and
prediction unit that predicts, based on the history, that a failure is likely to occur with respect to the wireless communication device.

6. A failure prediction method comprising:
acquiring history data that is generated by at least one wireless communication device, the history data indicating, with respect to each predetermined period, at least: a first time indicating a time for which a received signal level in a main receiver for the wireless communication device is below a predetermined threshold level; a second time indicating a time for which a received signal level in a secondary receiver for the wireless communication device is below the threshold level; and a third time indicating a time for which a level of a received signal produced through combination in a combiner that combines received signals received by the main receiver and the secondary receiver is below the threshold level; and
predicting, based on the first time, the second time, and the third time in the history data, that a failure is likely to occur with respect to the wireless communication device.

7. The failure prediction method according to claim 6, comprising:
determining that, with respect to the wireless communication device, an event being likely to cause a failure on a wireless line occurred, if the second time falls within a predetermined range and the first time is equal to or less than a predetermined first threshold time.

8. The failure prediction method according to claim 7, comprising:
determining that an abnormality in the secondary receiver occurred if the second time is equal to or greater than a predetermined second threshold time, and determining that an abnormality in the combiner occurred if the third time is equal to or greater than a predetermined third threshold time; and
if the prediction unit determines that: an event being likely to cause a failure on the wireless line occurred; then an abnormality in the secondary receiver occurred; and then an abnormality in the combiner occurred, causing a first warning to be displayed, the first warning indicating that a failure on a wireless line is likely to occur with respect to the wireless communication device.

9. A wireless communication system comprising:
at least one wireless communication device;
acquisition unit that acquires history data which is generated by the wireless communication device and which at least indicates a time for which a received signal level is below a predetermined threshold level during each predetermined period; and
prediction unit that predicts, based on the history data, that a failure is likely to occur with respect to the wireless communication device,
wherein the wireless communication device comprises:
a main receiver;
a secondary receiver; and
a combiner that combines received signals received by the main receiver and the secondary receiver,
wherein information about the received signal level comprises: a first time indicating a time for which a received signal level in the main receiver is below the threshold level; a second time indicating a time for which a received signal level in the secondary receiver is below the threshold level; and a third time indicating a time for which a level of a received signal produced through combination in the combiner is below the threshold level, and wherein the prediction unit predicts, based on the first time, the second time, and the third time, that a failure is likely to occur with respect to the wireless communication device.

10. A non-transitory computer-readable medium where a program is stored, the program causing a computer to execute a method, the method comprising:

acquiring history data that is generated by at least one wireless communication device, the history data indicating, with respect to each predetermined period, at least: a first time indicating a time for which a received signal level in a main receiver for the wireless communication device is below a predetermined threshold level; a second time indicating a time for which a received signal level in a secondary receiver for the wireless communication device is below the threshold level; and a third time indicating a time for which a level of a received signal produced through combination in a combiner that combines received signals received by the main receiver and the secondary receiver is below the threshold level; and predicting, based on the first time, the second time, and the third time in the history data, that a failure is likely to occur with respect to the wireless communication device.

* * * * *